(12) United States Patent
Chen

(10) Patent No.: US 7,515,827 B2
(45) Date of Patent: Apr. 7, 2009

(54) PHOTOGRAPHING APPARATUS AND METHOD FOR TAKING A PICTURE

(75) Inventor: Wen-Way Chen, Hsinchu Hsien (TW)

(73) Assignee: Qisda Corporation, Taoyuan County (TW)

( * ) Notice: Subject to any disclaimer, the term of this patent is extended or adjusted under 35 U.S.C. 154(b) by 558 days.

(21) Appl. No.: 11/399,810

(22) Filed: Apr. 7, 2006

(65) Prior Publication Data
US 2006/0228104 A1    Oct. 12, 2006

(30) Foreign Application Priority Data
Apr. 8, 2005    (TW) .............................. 94111217 A

(51) Int. Cl.
| | |
|---|---|
| G03B 19/00 | (2006.01) |
| G03B 15/00 | (2006.01) |
| G03B 13/00 | (2006.01) |
| G03B 17/18 | (2006.01) |
| G06K 9/32 | (2006.01) |
| G06K 9/36 | (2006.01) |
| G06K 9/60 | (2006.01) |
| H04N 9/74 | (2006.01) |

(52) U.S. Cl. ........................... 396/429; 396/3; 396/287; 396/661; 382/298; 382/284; 382/305; 382/312; 348/586

(58) Field of Classification Search ................. 396/287, 396/3, 20, 429, 661; 382/276, 282, 284, 382/291, 298, 305, 308, 309, 312, 313; 348/239, 348/584, 586, 589
See application file for complete search history.

(56) References Cited

U.S. PATENT DOCUMENTS

| 5,459,529 | A | * | 10/1995 | Searby et al. ................ 348/586 |
| 5,469,536 | A | * | 11/1995 | Blank .......................... 345/594 |
| 5,519,826 | A | * | 5/1996 | Harper et al. ............... 345/473 |
| 6,456,300 | B1 | * | 9/2002 | Pettigrew ..................... 345/634 |
| 7,016,116 | B2 | * | 3/2006 | Dolgoff ....................... 359/630 |
| 7,236,622 | B2 | * | 6/2007 | Chen et al. .................. 382/132 |
| 2003/0043298 | A1 | * | 3/2003 | Ohsuki et al. ............... 348/584 |

* cited by examiner

*Primary Examiner*—Rochelle-Ann J Blackman

(57) ABSTRACT

A photographing apparatus includes a storage device for storing a silhouette image; an image sensor for capturing a first image of an object, the first image including a first object image and a first background image; a comparison module for comparing the first object image with respect to the silhouette image to obtaining a base difference; and a correction module for correcting position of the first object image with respect to the first image to obtain a second image of the object according to the base difference. The second image includes a second object image incorporating with the silhouette image to define a first difference that is smaller than a predetermined value.

18 Claims, 6 Drawing Sheets

PHOTOGRAPHING APPARATUS AND METHOD FOR TAKING A PICTURE

FIELD OF THE INVENTION

The present invention relates to a photographing apparatus and method for photographing an object, more particularly to the photographing method and the photographing apparatus, in which position of the foreground of an image can be adjusted with respect to the display panel in order to take a suitable photo.

BACKGROUND OF THE INVENTION

A photographing apparatus is a handy instrument in our daily life. Taking some photos in daily life for keeping as memoir is common and prevalent today. Since the digital photographing apparatus comes into the market, photo taking is more common than ever because the photos can be kept in the personal computer for storage, and they are not required to be printed out as in the olden days, thereby saving the expense. Nowadays, nearly every household possesses a photographing apparatus.

A photo generally includes a foreground and a background. The foreground usually is a person or a group of people while the background is a scenery or landscape. Due to lack of professional skill of the user, the photo often looks uncomfortable since the main character (foreground) is not in the proper place (i.e. the main character is too small with respect to the background or is at one corner of the photo). The result is aggravated in case the apparatus is setup in an auto mode in advance with the owner of the apparatus participating in the object prior to being shot. The position of the main character cannot be adjusted with respect to the background since the user cannot see the shooting target during the shooting period, thereby decreasing the quality of the photo.

Therefore, the present invention is to provide a method for taking a picture and the photographing apparatus in which the position of the main character can be adjusted relative to the display device.

SUMMARY OF THE INVENTION

The object of the present invention is to provide the method and the photographing apparatus in which the position of the main character can be adjusted with respect to the display panel, thereby avoiding the problems encountered during use of the conventional photographing apparatus.

In one aspect of the present invention, a photographing apparatus is provided to include a display panel; a storage device for storing a silhouette image file of an object and capable of converting the silhouette image file into a silhouette image; an image sensor for capturing a first image of the object, the first image including a first foreground (an first object image) and a first background behind the first foreground; a comparison module for comparing the first object image with respect to the silhouette image, thereby obtaining a base difference; and a correction module for correcting position of the first object image with respect to the first image according to the base difference in order to obtain a second image, wherein the second image includes a second foreground (second object image) incorporating with the silhouette image to define a first difference that is smaller than a predetermined value.

In another aspect of the present invention, a photographing method is provided for taking an image of an object by a photographing apparatus. The method includes the steps of: (a) storing a silhouette image; (b) capturing a first image of the object, the first image including a first object image and a first background; (c) comparing the first object image with respect to the silhouette image, thereby obtaining a base difference; and (d) correcting position of the first object image with respect to the first image according to the base difference in order to obtain a second image. The second image includes a second object image that incorporates with the silhouette image to define a first difference that is smaller than a predetermined value.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

Figure 1:
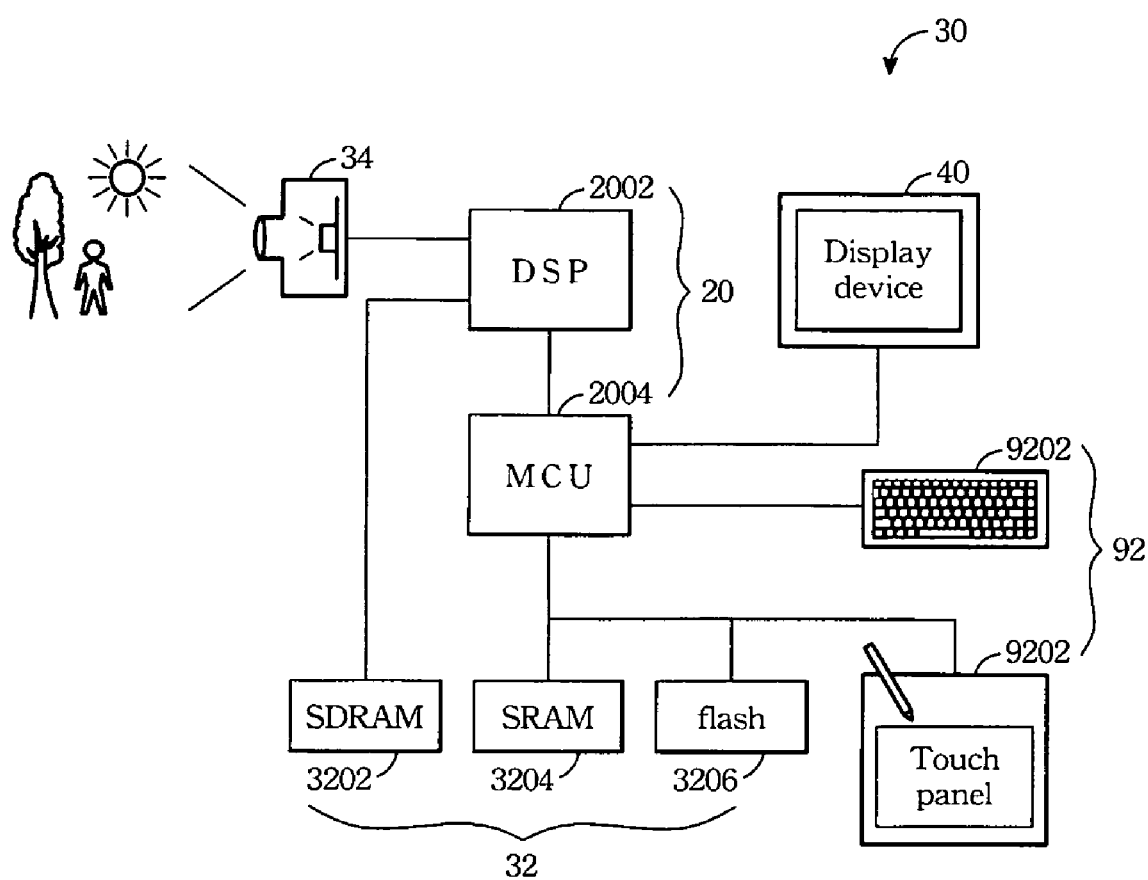
FIG. 1 is a block diagram illustrating the hardware employed in a photographing apparatus of the present invention.

Referring to FIG. 1, a block diagram of the hardware of the photographing apparatus 30 according to the present invention is shown to include a processor 20 [such as DSP 2002 (digital signal processor), MCU 2004 (micro controller unit)], a storage device 32 (such as SDRAM 3202, SRAM 3204, flash 3206), an input device 92 (such as a keyboard 9202, a touch panel 9204), a display device 40 and an image sensor 34.

Figure 2:
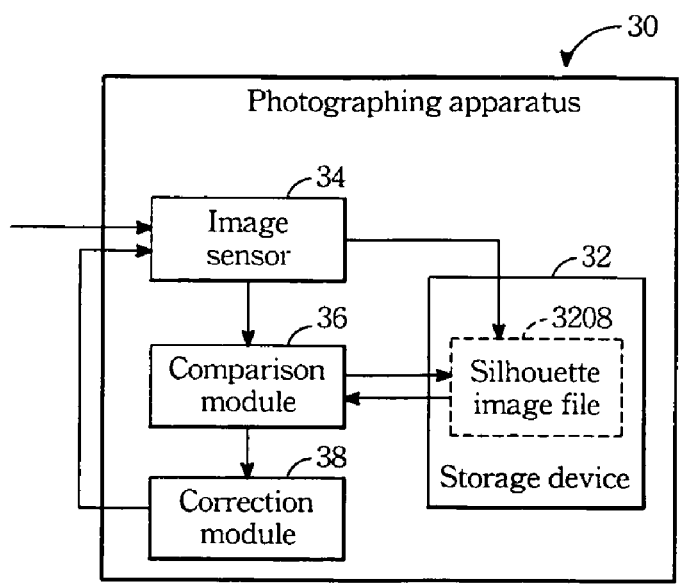
FIG. 2 is block diagram illustrating the hardware and the software employed in the photographing apparatus of the present invention.

FIG. 2 illustrates the hardware and software forming the photographing apparatus of the present invention. The photographing apparatus 30 further includes a comparison module 36 and a correction module 38.

The image sensor 34 captures a silhouette image of an object in advance and the processor DSP 2002, MCU 2004 of FIG. 1 converts the silhouette image into the silhouette image file 3208 that is stored in the storage device 32 (flash 3206). Alternately, a plurality of the silhouette image files 3208 can be stored in the storage device 32 in advance by using other methods. For example, drawing several silhouette images on the touch panel 9204 and the silhouette image files are stored in the storage device 32.

The image sensor 34 is used for capturing a first image 44 (see FIG. 3) of the object. A CMOS (Complementary Metal-Oxide Semiconductor) or CCD (Charge-Coupled Device) serves as the image sensor 34 in the photographing apparatus of the present invention. The first image 44 includes a foreground 4402 and a background 4403 behind the foreground 4402. The first image 44 is temporarily stored within the storage device SDRAM 3202 of FIG. 1.

The comparison module 36 fetches the first foreground 4402 from the storage device SDRAM 3202, compares the first foreground 4402 with respect to the silhouette image file 3208 from the flash 3206 in order to obtain a base difference.

The correcting module 38 is used for correcting position of the first foreground with respect to the display panel of the display device 40 according to the base difference in order to obtain a second image. The second image includes a second foreground that incorporates with the silhouette image to define a first difference that is smaller than a predetermined value. Therefore, the second foreground is located at the proper position with respect to the display panel by virtue of the aforesaid adjustment.

The comparison and correction modules 36, 38 are written into a program by means of assembly language and the latter is stored within the storage device 32 (Non-Volatile Random Access Memory like flash 3206 or ROM) in advance, and cooperates with the MCU to achieve the aforesaid adjustment.

Figure 3:
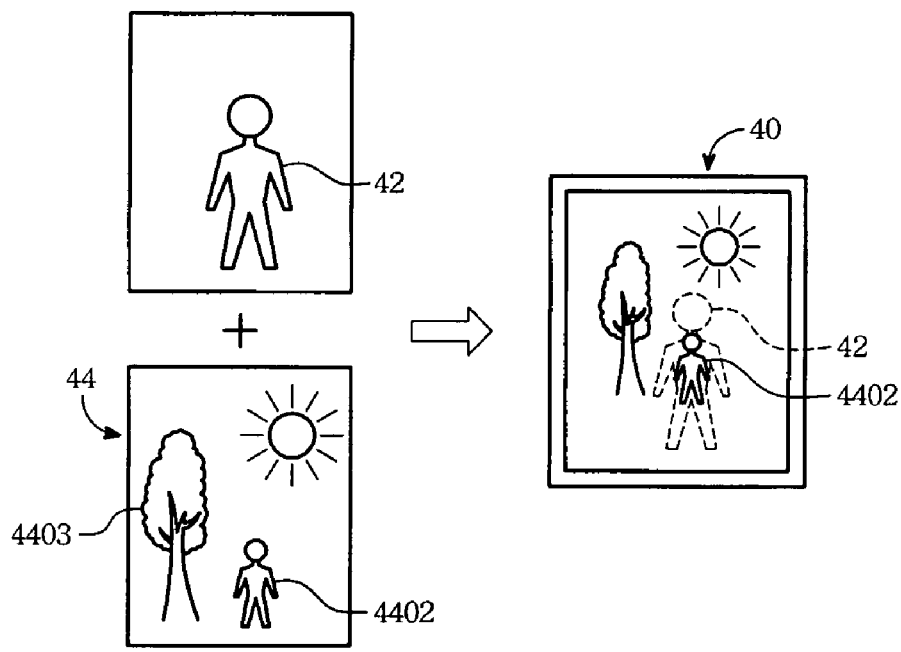
FIG. 3 is a display panel of the photographing apparatus of the present invention.

FIG. 3 illustrates the display device 40 of the photographing apparatus 30 of the present invention, wherein the device 40 includes a display panel for displaying the silhouette image 42, the first image 44, and the second image is finally displayed in the display panel after the aforesaid adjustment, in which, the silhouette image 42 overlaps the foreground 4402 (main character) so as to form the base difference.

Figure 4:
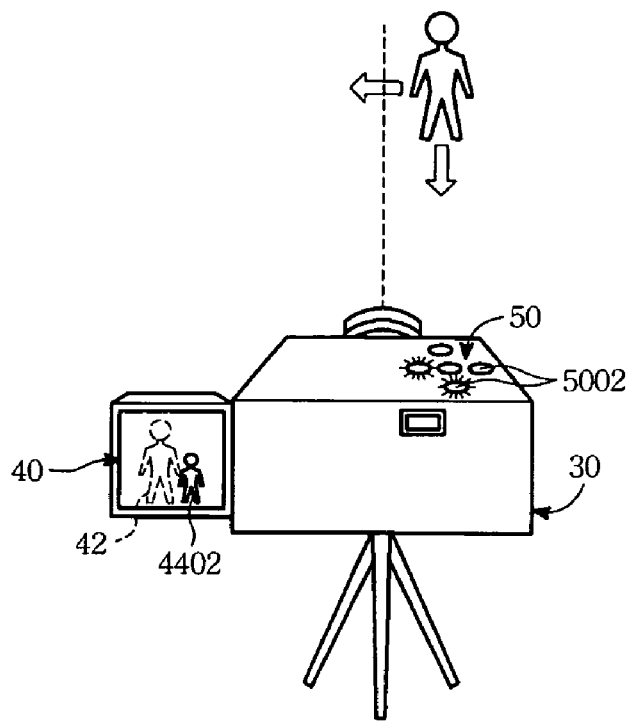
FIG. 4 illustrates a first embodiment of a correction module of the photographing apparatus of the present invention in operation.

FIG. 4 is a first embodiment, illustrating operation of the correction module 38 in the photographing apparatus 30 of the present invention. The correction module 38 includes an indicating lamp 50 that is used for indicating signal moving direction of the first foreground 4402 with respect to the silhouette image 42. As shown, the indicating lamp 50 includes five LED units 5002, representing "front", "rear", "left", "right" and "fine" points (positions), respectively. For example, in case the "front" and "left" points (light bulbs) emit light beams interruptedly, the shooting lens of the photographing apparatus 30 should turn in those directions until the "fine" point emits light continuously. Under this condition, shooting operation of the second image should go ahead since the foreground 4402 is at the most appropriate position in the display panel.

Figure 5:
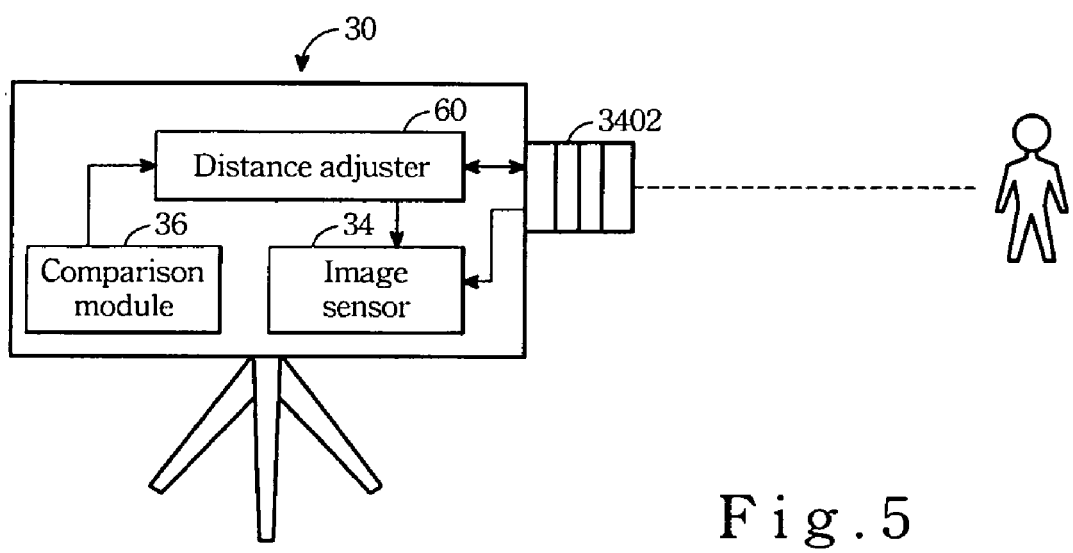
FIG. 5 illustrates a second embodiment of the correction module of the photographing apparatus of the present invention in operation.

FIG. 5 is a second embodiment, illustrating operation of the correction module 38 in the photographing apparatus 30 of the present invention. The correction module 38 includes a distance adjustor 60 for adjusting (zoom in or zoom out) the shooting distance of the image with respect to the zoom 3402 of the image sensor 34 in order to provide the first difference smaller than a predetermined value. Upon obtaining the first difference, shooting operation of the second image should go ahead since the zoom 3402 permits the most appropriate position of the second image in the display panel.

Figure 6:
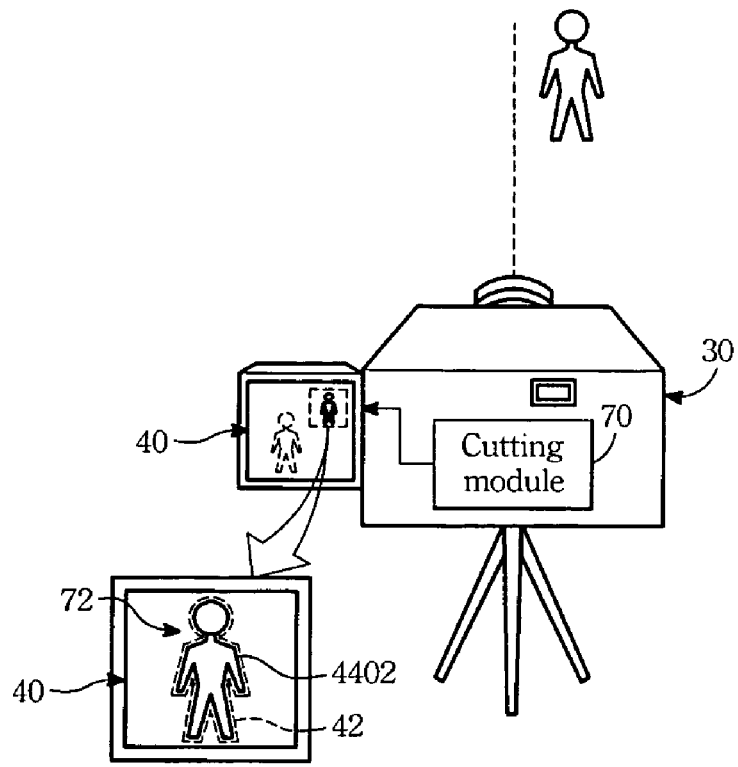
FIG. 6 illustrates a third embodiment of the correction module of the photographing apparatus of the present invention in operation.

FIG. 6 is a third embodiment illustrating operation of the correction module 38 in the photographing apparatus 30 of the present invention. The correction module 38 includes a cutting module 70 for cutting the second foreground 72 off the second image, wherein the second foreground 72 and the silhouette image 42 cooperatively define the first difference that is smaller than the threshold. Under this condition, the second foreground 72 can serve as the second image since the latter is at the most appropriate position in the display panel.

There are several ways to conduct the position correcting operation of the foreground 4402 with respect to the silhouette image 42. In FIG. 3, the object is a person. The silhouette image 42 corresponds to the person. The comparison module 36 compares the first foreground 4402 of the first image 44 with respect to the silhouette image 42 in order to obtain the base difference.

Figure 7:
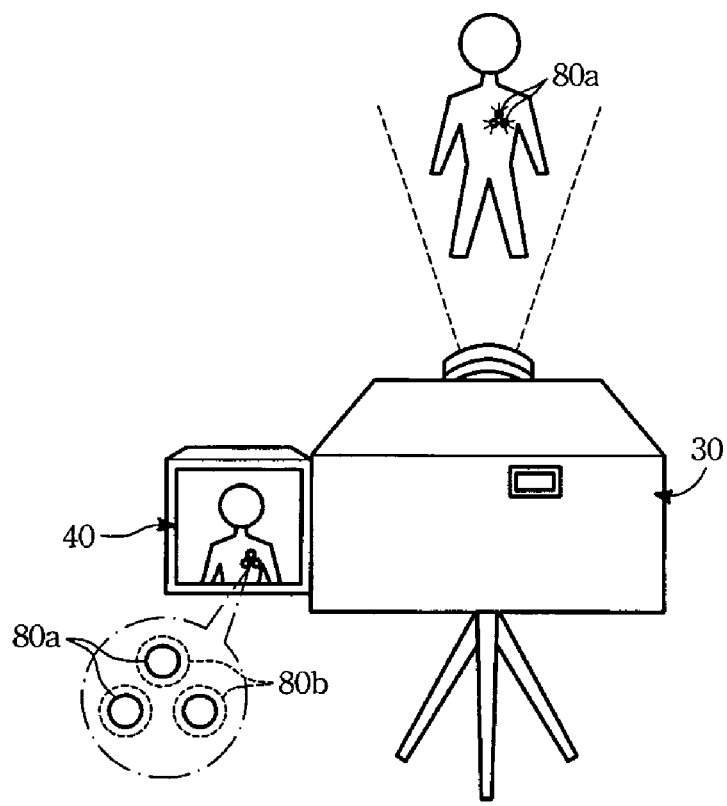
FIG. 7 is one embodiment illustrating how a foreground is compared with respect to a silhouette image in the photographing apparatus of the present invention.

FIG. 7 shows one embodiment illustrating how the foreground 4402 is compared to the silhouette image 42 in order to obtain the first difference in the photographing apparatus of the present invention. The second foreground and the silhouette image can be light-emitting points 80*a*, 80*b* respectively. The comparison module 36 compares one of the light-emitting points 80*a* to the second foreground and the other one of the light-emitting points 80*b* to the silhouette image. Thus, the distance difference between the points is the first difference.

Figure 8:
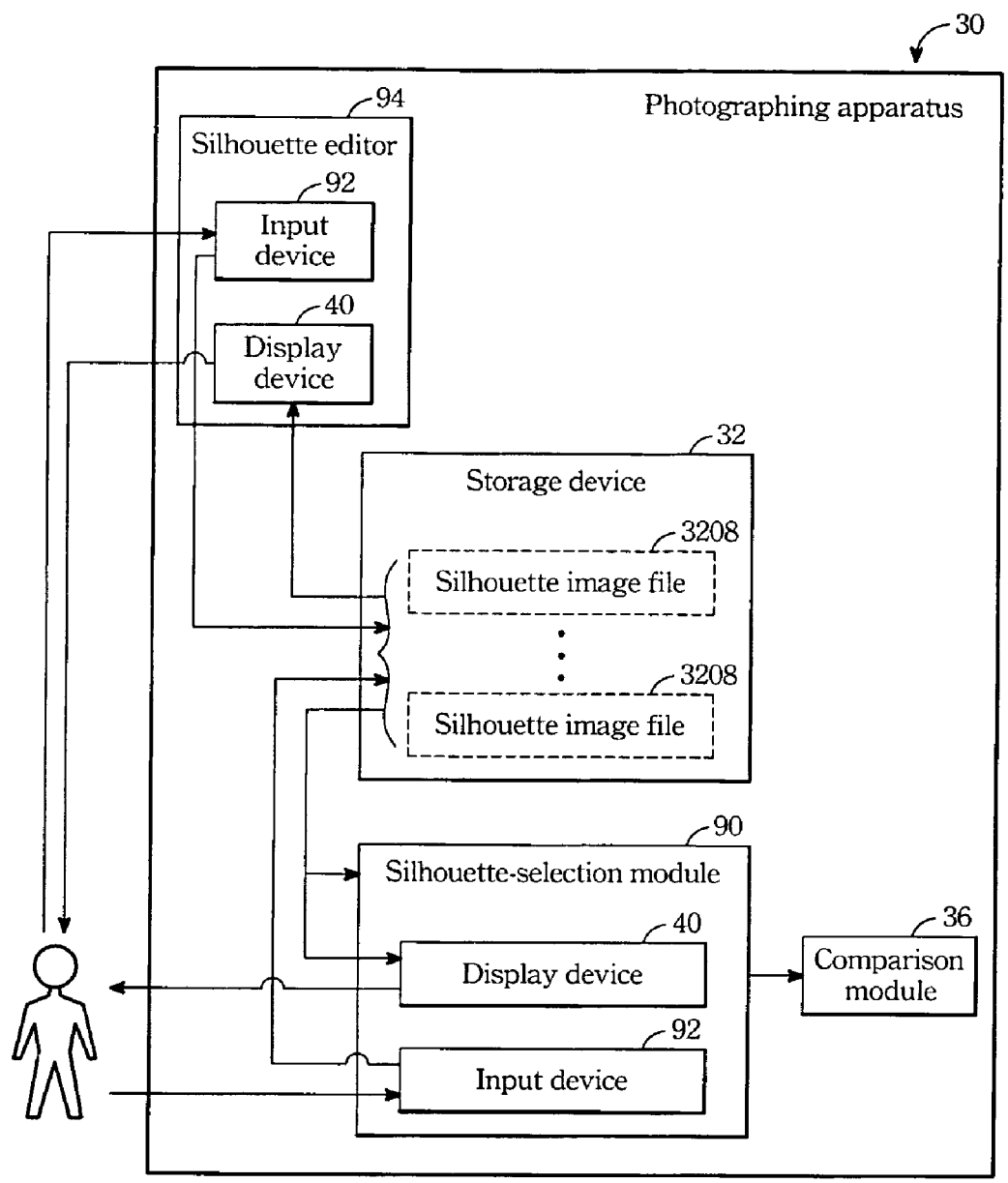
FIG. 8 is a block diagram illustrating how a silhouette-selection module selects a silhouette image in the photographing apparatus of the present invention.

Referring to FIG. 8, the photographing apparatus 30 of the present invention further includes a silhouette-selection module 90 and a silhouette editor 94. The silhouette-selection module 90 selects one of said silhouette image files 3208 from the storage device 32 and supplies said selected silhouette image file to the comparison module 36 for conducting a comparison action with respect to the first image. The silhouette editor 94 is used for editing said silhouette image files stored within the storage device 32 so as to obtain an edited silhouette image for supplying to the comparison module 36 to conduct a comparison action with respect to the first image.

Figure 9:
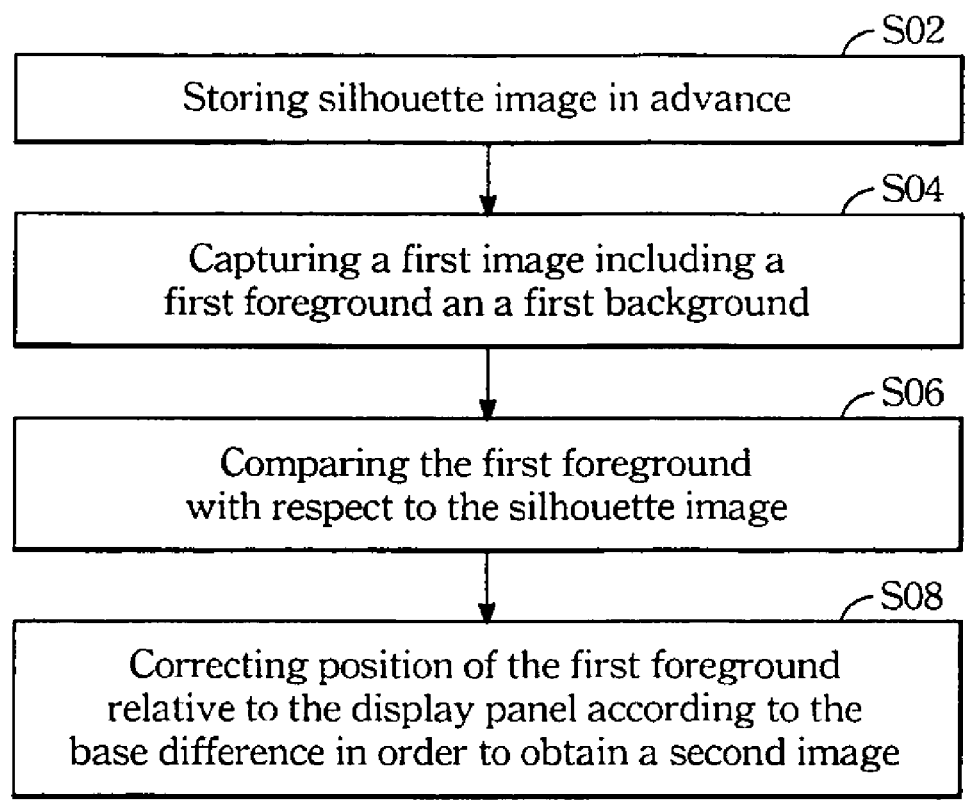
FIG. 9 is a block diagram illustrating the steps of taking an image of an object by the photographing apparatus of the present invention.

FIG. 9 is the block diagram illustrating the photographing method for taking an image of an object by using the photographing apparatus of the present invention. The photographing apparatus includes a display device, the method comprising the steps of:

(S02) storing a silhouette image 42 of the object in advance within the storage device 32;

(S04) capturing a first image 44 of the object, the first image including a first object image 4402 and a first background behind the first object image 4402;

(S06) comparing the first object image 4402 with respect to the silhouette image 42, thereby obtaining a base difference; and (S08) correcting position of the first object image 4402 with respect to the first image according to the base difference in order to obtain a second image, wherein, the second image includes a second foreground incorporating with the silhouette image 42 to define a first difference that is smaller than a predetermined value.

In summary, by virtue of the software and hardware employed in the photographing apparatus 30 the present invention, the user can get a standard photo regardless of lack of the photographing skill since the apparatus itself can adjust the foreground with respect to the display panel.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A photographing apparatus comprising:
a storage device for storing a silhouette image;

an image sensor for capturing a first image of an object, said first image including a first object image and a first background image;

a comparison module for comparing said first object image with respect to said silhouette image, thereby obtaining a base difference;

a correction module for correcting position of said first object image with respect to said first image and obtaining a second image of the object according to said base difference;

wherein, said second image includes a second object image incorporating with said silhouette image to define a first difference that is smaller than a predetermined value.

2. The photographing apparatus according to claim 1, further comprising a display device for displaying said silhouette image, said first image and said second image.

3. The photographing apparatus according to claim 1, wherein said image sensor captures an image of the object and coverts said image to said silhouette image and saves said silhouette image within said storage device.

4. The photographing apparatus according to claim 1, wherein said storage device is stored with a plurality of said silhouette images, the photographing apparatus further comprising a silhouette-selection module that selects one of said silhouette images and supplies said selected silhouette image to said comparison module for conducting a comparison action.

5. The photographing apparatus according to claim 1, further comprising a silhouette image editor for editing said silhouette images stored within said storage device so as to obtain an edited silhouette image for supplying to said comparison module to conduct a comparison action.

6. The photographing apparatus according to claim 1, wherein said storage device is a flash memory card.

7. The photographing apparatus according to claim 1, wherein said image sensor is a CMOS (Complementary Metal-Oxide Semiconductor).

8. The photographing apparatus according to claim 1, wherein said image capturing device is a CCD (Charge-Coupled device).

9. The photographing apparatus according to claim 1, wherein said correction module includes an indicator for indicating a moving direction for said object to reduce the base difference.

10. The photographing apparatus according to claim 1, wherein said correction module includes a distance adjustor for adjusting a shooting distance of said first image with respect to said image sensor in order to provide said first difference smaller than said threshold or said predetermined value.

11. The photographing apparatus according to claim 1, wherein said correction module includes a cutting module for cutting said second image off said first image.

12. The photographing apparatus according to claim 1, wherein said second object image and said silhouette image are two light-emitting points respectively, said comparison module comparing one of said light-emitting points to said second object image and the other one of said light-emitting points to said silhouette image in order to obtain said first difference.

13. The photographing apparatus according to claim 1, wherein said object is a person, said silhouette image corresponding to said person, said comparison module comparing said first object image of said first image with respect to said silhouette image in order to obtain said base difference.

14. A photographing method for taking an image of an object, the method comprising the steps of:
(a) storing a silhouette image;
(b) capturing a first image of the object, said first image including a first object image and a first background;
(c) comparing said first object image with respect to said silhouette image, thereby obtaining a base difference; and
(d) correcting position of said first object image with respect to the first image according to said base difference in order to obtain a second image, wherein, said second image includes a second object image incorporating with said silhouette image to define a first difference that is smaller than a predetermined value.

15. The photographing method according to claim 14, further comprising:
capturing an image of the object;
converting said image to said silhouette image.

16. The photographing method according to claim 14, further comprising:
storing a plurality of said silhouette images;
selecting one of said silhouette images and using said selected silhouette image for step (a).

17. The photographing method according to claim 14, further comprising:
providing a moving direction for the object;
the object moving according the moving direction to reduce the base difference.

18. The photographing method according to claim 14, further comprising:
adjusting a shooting distance of said first image in order to provide said first difference smaller than said predetermined value.

* * * * *